United States Patent [19]

Fawzy

[11] Patent Number: 4,565,938
[45] Date of Patent: * Jan. 21, 1986

[54] PERMANENT MAGNET ROTOR TOROIDAL GENERATOR AND MOTOR

[75] Inventor: Moharram M. Fawzy, Malvern, Pa.

[73] Assignee: Intra-Technology Associates, Inc., Malvern, Pa.

[*] Notice: The portion of the term of this patent subsequent to Jul. 10, 2001 has been disclaimed.

[21] Appl. No.: 629,102

[22] Filed: Jul. 9, 1984

Related U.S. Application Data

[63] Continuation-in-part of Ser. No. 503,914, Jun. 13, 1983, Pat. No. 4,459,501.

[51] Int. Cl.⁴ ............................................. H02K 21/12
[52] U.S. Cl. .................................................... 310/156
[58] Field of Search ............... 310/156, 263, 264, 268, 310/49 R, 181

[56] References Cited

U.S. PATENT DOCUMENTS

| | | | |
|---|---|---|---|
| 3,549,924 | 12/1970 | Klein | 310/181 X |
| 3,906,267 | 9/1975 | Coupin et al. | 310/156 X |
| 4,075,519 | 2/1978 | Mrcun | 310/263 X |
| 4,334,160 | 6/1982 | McCarty | 310/156 X |
| 4,417,186 | 11/1983 | Hirose | 310/156 X |
| 4,459,501 | 7/1984 | Fawzy | 310/156 |
| 4,488,075 | 12/1984 | DeCesare | 310/156 |

Primary Examiner—Mark O. Budd
Attorney, Agent, or Firm—John S. Munday

[57] ABSTRACT

An electromechanical device which can be used as a motor or as a generator. The device has a housing, including bearing means to support a rotatable shaft. Disc magnet means are provided, and poled to have alternating polarity and are mounted on the shaft to define a rotor.

The device includes at least one first pole shoe in contact with the magnet means, having a portion extending radially therefrom to define a virtual pole chamber, of a first polarity. Also included is at least one second pole shoe in contact with the magnet and having a portion extending radially therefrom to define a virtual pole chamber of the other polarity. A toroid stator is mounted on the housing and has windings thereon. The stator is positioned annularly around the disc magnets such that the virtual pole chambers of the first and second pole shoes surround portions of said windings with circumferentially alternating fields of alternating polarity. Means are provided for electrical contact with the stator to draw off current when the device is operated as a generator, or provide current to operate the device as a motor.

12 Claims, 4 Drawing Figures

PERMANENT MAGNET ROTOR TOROIDAL GENERATOR AND MOTOR

BACKGROUND OF THE INVENTION

This is a continuation-in-part of a co-pending U.S. patent application Ser. No. 503,914 filed June 13, 1983, for a Toroidal Generator and Motor with Radially Extending Magnetic Poles, now U.S. Pat. No. 4,459,501 issued July 19, 1984.

This invention relates to an electromechanical device which can be used as a generator, electric motor, and other types of magnetic rotating components including polyphase generators and motors, stepper motors, brushless motors and the like. Because of the design, these device are admirably suited for use where flat or "pancake" designs are used.

Many electromechanical devices have been designed heretofor with varying efficiencies and ability. When size and shape are of no concern, motors and generators which utilize electrical power can be built for almost any purpose with good success. This is particularly true when the most of the device is not considered. Difficulties and inefficiencies occur when other criteria, such as size, shape, cost etc. are incorporated into the design.

One such example of where design requirements place a burden on the motor is disclosed in U.S. Pat. No. 4,225,798 to Barrett. In Barrett, a long thin motor is disclosed which is suitable for operating automobile window opening and closing apparatus mounted in a hollow door of the vehicle. As is taught therein, considerations of space, weight and configuration have caused conventional motor design to be inadequate, particularly if they are o the common cylindrical construction. The inadequacy of cylindrical motors is clearly taught in Barrett. Another example of disadvantages of cylindrical design, when the length of the cylinder is shortened is shown in U.S. Pat. No. 4,283,647 to Herr et al. Leakage is obviously a major problem.

To obviate the design limitations shown therein, Barrett has proposed a design which includes a structure having at least two permanent magnets and at least two field shoes. Each field shoe has an arcuate surface which forms one side of an air gap between the shoe and the armature. The field shoe has a thickness and crosssectional area which varies substantially in proportion to the density of magnetic flux carried by the shoe. Also the air gap is varied by constructing the shoe in a nonconcentric shape. The preferred design includes two magnets and shoes, and is reported to be a powerful motor for its given size and weight. The design requirements call for a number of shaped parts for close tolerance and cooperation during the operation of the motor.

Another electromechanical machine of a flat or "pancake" design is disclosed in U.S. Pat. No. 4,188,556 to Hahn, which teaches the use of flat stator members having a circular array of magnets arranged in a suitable manner. Nevertheless, to increase power it is necessary to increase the number of magnets, thus increasing cost, weight and construction difficulties.

Other "pancake" motors which have significant power limitations are described in U.S. Pat. No. 3,315,106 to Reyst et al. In Reyst et al, the difficulties incurred with the use of printed circuit rotor discs are set forth. Reyst et al suggests the use of laminated rotors to overcome the limitations of printed circuits. U.S. Pat. No. 3,348,086 to Monma discloses another flat motor, in which flat coils are arranged on the core in a specified manner. Another such patent, which uses permanent magnet stators, is U.S. Pat. No. 3,469,133 as does the design taught in U.S. Pat. No. 3,904,902, in U.S. Pat. No. 3,993,920 and in its related U.S. Pat. No. 4,143,288.

Nevertheless, none of the above or other patents teach that a motor or generator can be designed which optimized the ratio of the active length of a winding turn, or which permits addition of virtual poles without resorting to addition of actual magnets to reduce the core size needed for a given performance. Accordingly it is an object of this invention to provide an electromechanical device which is of high efficiency and power with low cost and without intricate or complicated design. It is an object to create a motor/generator using only two disc magnets yet having the ability to increase the number of virtual poles.

SUMMARY OF THE INVENTION

The foregoing and additional objects are achieved in accordance with the principles of this invention as follows. An electromechanical device useful as a motor or as a generator is provided, having a housing shaped as desired. In the housing bearing means are provided to support a rotatable shaft which can be connected to whatever equipment the device is to be used with.

Disc magnet means are magnetized, and are mounted on the shaft to define a rotor. Also associated with each magnet is at least one first pole shoe, in contact with the first polarity poles of the disc magnet means, and having portions extending radially from the face to define a pair of virtual pole chambers of the first polarity. At least one second pole shoe is provided in contact with the disc magnet means and has portions extending radially to define similarly a pair of virtual poles of the second polarity. A toroid stator is mounted on the housing, and has toroidal windings thereon. The stator or toroid is positioned annularly around the disc magnets such that the first and second pole shoes surround portions of the windings with alternating fields of polarity and mounted via means attached to the face of the toroid and to the opposing face of the housing. Up to 96% of the active winding may be enclosed by the shoes. Means for electrical contact with the stator, of conventional design to either supply current in the generator configuration or receive current in the motor mode, are provided.

In a preferred embodiment, the disc magnet means comprises a single disc magnet with each face poled in opposite polarity. Thus the pole shoes contact one face to define one virtual pole chamber or the other face to define the other pole chamber.

In yet another embodiment, a pair of disc magnets are poled to have opposite polarity on their faces and are positioned to have faces of a first polarity facing one another, so that the faces of the second polarity are facing ourward. The first pair of pole shoes is positioned to contact both of said two inner disc magnet faces which are facing each other and each has a portion which extends radially to define a uniquely shaped pair of virtual pole chambers of this first polarity. A pair of second pole shoes are positioned so that each will contact one of the two outer faces of the disc magnets and has a portion which extends radially to define a pair of uniquely shaped virtual pole chambers of the same polarity as this second or outer pair of disc magnet faces. By providing at least two first pole shoes and at least two second pole shoes, the number of virtual poles of alternating polarity which surround the toroid can be doubled. More pairs of pole shoe extensions will permit the number of virtual poles to be increased to any desired number without adding any new magnets. This change in the number vitual poles without change in the number of magnets is a great advantage and provides much versatility for these motors and generators, and can be accomplished even when only one disc magnet is used.

The most preferred configuration for the first pole shoe includes a flat portion which covers the face of the disc magnets which is facing inward and a pair of cup portions which define a chamber sized to accept the toroid. The additional first pole shoe for the other inward facing portion of the other disc magnet cooperatively defines a chamber whereby the toroid is totally encircled, except for allowance for toroid mounting by a virtual pole of the same polarity as the two inward faces of the magnets. Each of the magnets has a second pole shoe covering the outward face and having a cup portion which cooperates with the other second pole shoe to define a chamber surrounding the toroid as in the first pole shoe. These two chambers are each designed to be adjacent to 100% of the length of winding on the toroid, exclusive of the allowance for mounting the toroid. Closure means are used to substantially enclose the stator.

BRIEF DESCRIPTION OF THE DRAWINGS

The foregoing and other objects of this invention and the particular feature of various embodiments will be more clearly understood from the following detailed description thereof, when read in conjunction with the accompanying drawings, in which.

DETAILED DESCRIPTION OF THE INVENTION

Figure 2:
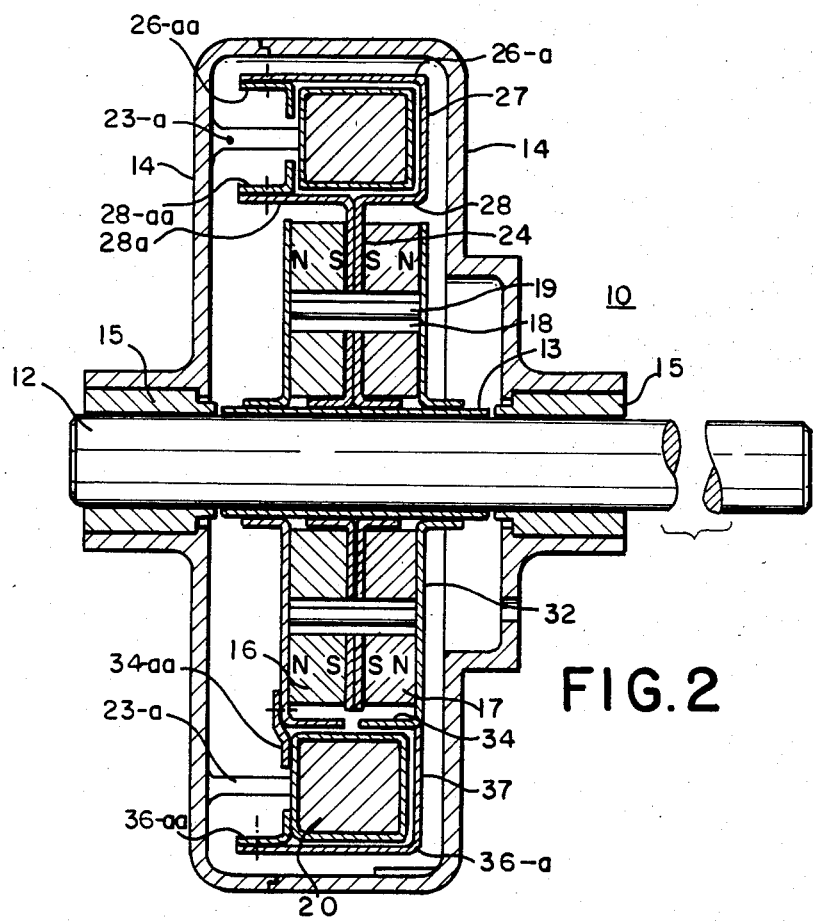
FIG. 2 is a partially sectioned view of an entire device according to the preferred embodiment.

Referring now to the drawings wherein like elements in different figures thereof have the same reference character applied thereto, an electromechanical device useful as a motor or as a generator is designated by the reference numeral 10. In FIG. 2, a shaft 12 is fitted with mounting sleeves 13 inside housing 14. Bearings 15 are provided to support rotation of shaft 12. A pair of disc magnets 16 and 17 are poled to have opposite polarity on the faces, and are mounted on shaft 12 to define a rotor. Two south polarity faces S of magnets 16 and 17 are positioned facing each other so that the outer faces have north polarity N. An alignment bushing 18 provides a location for fastening bolts through the holes defined by axis 19.

The toroid stator core 20 is fitted with toroid windings 22 of conventional construction, and mounted to housing 14 via mounting mean 23a to form the stator. Mounting means 23a are attached to the face of the toroid stator core 20 and the opposing face of housing 14. As will be explained herein, a first pole shoe 24 contacts the south polarity face of the magnet 17 and has a portion extending radially away from magnet 17 to define a cup shaped virtual south pole as described by members 26a, 27, 28 and 28a. Similarly pole show 32 contacts the outer or north polarity face of magnet 17 and extends radially from magnet 17 to define a pair of north polarity virtual poles at 34, 36a and 37. The toroid stator core 20 is positioned annularly around magnets 16 and 17 so that first pole shoe 24 and second pole shoe 32 surround portions of the windings 22 with alternating south and north polarity from the virtual poles. Means are provided for electrical contact with the stator, of conventional design such as in mounting means 23a, to permit flow of current into or out of the device as it operates as a motor or a generator. Similarly, a second set of shoes are positioned around the magnets.

Figure 1:
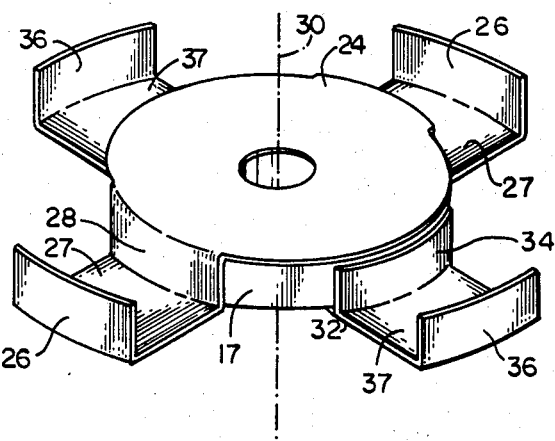
FIG. 1 is a perspective view of part of the preferred embodiment.

In the preferred embodiment, the disc magnet means is a single disc magnet having a north pole on one face and a south pole on the other face. FIG. 1 shows a single magnet 17 (with polarity not shown) in which first pole shoe 24 contacts a first polarity face of the magnet 17. The pole shoe 24 has a portion extending radially away from the magnet 17 to define the virtual pole. Similarly pole shoe 32 contacts the second polarity face and has a portion extending radially away to define the other virtual pole.

The toroid stator core would then be placed in the virtual poles so that the windings are surrounded with alternating north and south polarity from the virtual poles. FIG. 2 shows a design with two disc magnets 16 and 17. In the embodiment with one disc magnet, only magnet 17 would be present. Totoid stator core 20, with windings 22 would be sized to fit in the chamber defined by outer edge 26a, cavity 27 and inside edge 28 as shoe 24 contacted the S pole face of magnet 17. Likewise, pole shoe outer edge 36a, cavity 37 and inside edge 34 define a chamber for toroid stator core 20 as shoe 32 contacts the N pole face of magnet 17. Outer edges 36a and 26a would not be as long as shown in FIG. 2 if only magnet 17 was used, and toroid stator core 20 would be sized accordingly. The entire housing 14 could be made to fit the smaller space taken up by only one magnet 17, and, of course, the second pair of pole shoes for the second magnet 16 would be eliminated.

Another design of the pole shoes and their relationship is shown in FIG. 1 and FIG. 2 for two disc magnets. A disc magnet 17 has one face of one polarity covered with a first pole shoe 24, which has extended radially from the magnet on outer edge 26, cavity 27 and inside edge 28. The edge 26, cavity 27 and inside 28 defines a chamber into which the toroid stator core 20 is placed. Similarly, the second pole shoe has a face 32 in contact with the outside or other face of magnet 17, thereby having opposite polarity. Pole shoe outside edge 36, interconnecting edge 37 and inside edge 34, define a chamber of opposite polarity, thereby providing alternating north and south virtual poles in dynamic relationship with the stator.

As shown in FIG. 2, which is a partial section view, a typical magnet with its pole shoes and cavity forming edges can be visualized. This, in FIG. 2, pole shoe 24 surrounds toroid 20 at the top thereof via outside edge 26a, interconnecting edge 27 and inside edges 28 and 28a. Also added to outside edge 26a is a closure means 26aa which serves to substantially enclose stator 20, along with closure means 28aa on edge 28a, exclusive of allowance for stator mounting means 23a. The chamber essentially completely surrounds toroid 20 such that nearly all of the winding is within the field and is electrically active, except for a small space for mounting the toroid.

In the lower portion of FIG. 2, pole shoe 32 is shown with outside edge 36a, interconnecting member 37 and inside edge 34 defining a cavity in the same manner. Again, with a pair of pole shoes, 32 and 32a, the toroid 20 is nearly completely surounded by the virtual north pole cavity with the addition of closure means 34aa and 36aa.

Figure 3:
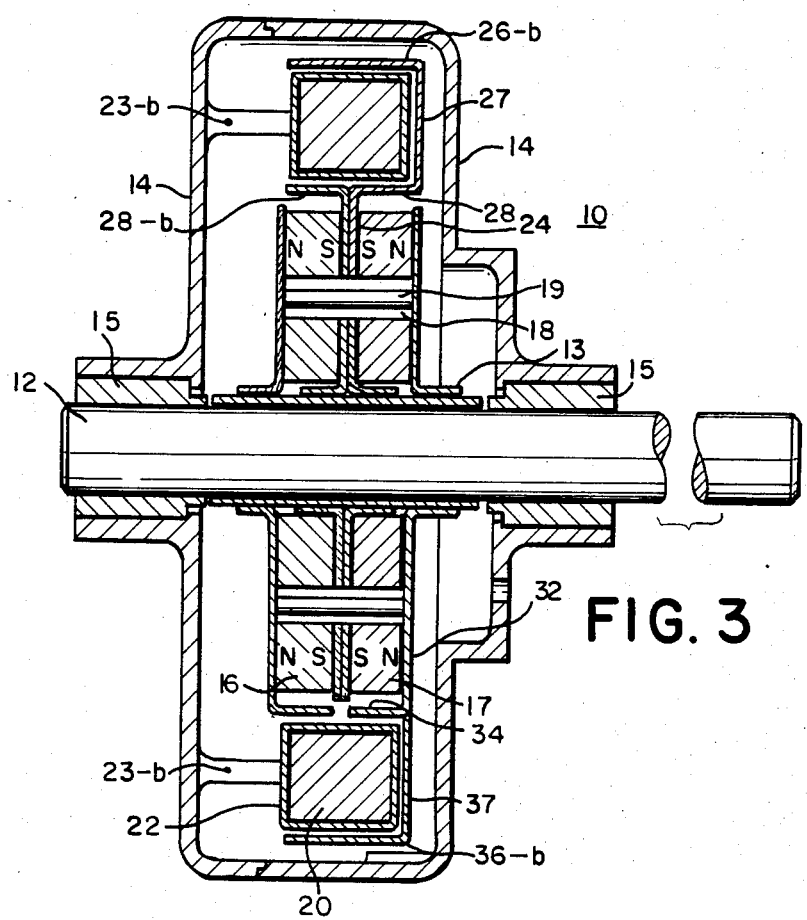
FIG. 3 is a partially sectioned view of an entire device according to another similar embodiment.

FIG. 3 is substantially the same as FIG. 2, except the extra closure means shown as 26aa, 28aa, 34aa and 36aa in FIG, 2 are not used in FIG. 3. The upper portion of FIG. 3 shows stator 20 enclosed by outer edge 26b, cavity 27 and inside edges 28 and 28b. Thus over three sides of the winding are enclosed, resulting in a simpler mechanical mounting arrangement. The lower portion of FIG. 3 shows stator 20 enclosed by edge 36b, cavity 37 and inner edge 34, again for ease of mounting as just described before.

Figure 4:
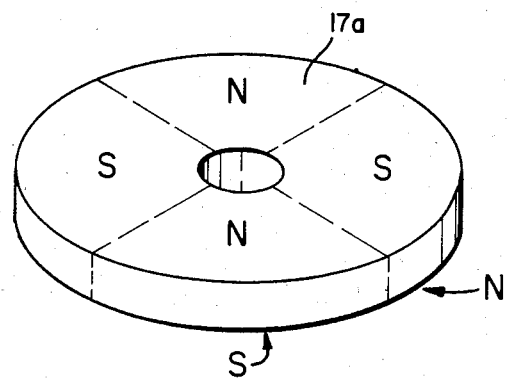
FIG. 4 is a perspective view illustrating another form of disc magnet means.

In FIG. 4, a different form of magnet is shown in which the alternating polarity portions extend circumferentially from the axis or center hold. Thus face 17a has alternating N and S polarity, while the underside has reverse S and N polarity. Use of such a disc magnet means would permit material economy, although care would be needed in shaping the pole shoes to attain the required chamber configuration.

In another embodiment, more than two disc magnets can be used, with increasingly complicated pole shoes to provide a chamber of alternating polarity to rotate about the stator.

It is understood that the above described embodiments are merely illustrative of the application of the principles of this invention. Numerous other embodiments may be devised by those skilled in the art without departing from the spirit and scope of this invention as defined by the appended claims.

I claim:

1. An electromechanical device, comprising:
   a housing, including bearing means supporting a rotatable shaft;
   a magnetized disc magnet means;
   at least one first pole shoe positioned to contact said magnet means at a first polarity and having portions extending radially outward to define a pair of virtual pole chambers of said first polarity;
   at least one second pole shoe positioned to contact said magnet means at a second polarity and having portions extending radially outward to define a pair of virtual pole chambers of said second polarity;
   a toroid stator mounted on said housing and having windings thereon, said stator being positioned annularly around said disc magnet means such that the virtual poles surround portions of said windings with alternating fields of polarity.

2. The device of claim 1 which includes at least two first pole shoes and at least two pair of second pole shoes positioned to surround said toroid with virtual pole chambers of alternating polarity.

3. The device of claim 1 wherein said disc magnet means includes a pair of disc magnets facing each other with a first polarity, and said first pole shoe has a flat portion covering the first polarity face of said disc magnets and a pair of cup portions extending radially from the periphery of said face to define a chamber sized to accept said toroid.

4. The device of claim 3 wherein said second pole shoe has a flat portion covering second polarity face of said disc magnets and a pair of cup portions extending radially from the periphery of said face to define a chamber sized to accept said toroid.

5. The device of claim 4 wherein the length of active winding on said toroid adjacent the cup portions is substantially all of the total winding length, exclusive of allowance for mounting said toroid.

6. The device of claim 1 wherein said disc magnet means includes a single disc magnet having faces with opposite polarities.

7. The device of claim 1, wherein said toroid stator includes mounting means attached to the face of said stator and to the opposing face of said housing.

8. The device of claim 7, wherein said first pole shoe has a pair of cup portions extending radially from the periphery of said disc magnet means to define a chamber sized to accept said toroid.

9. The device of claim 8, wherein said cup portions include closure means for substantially enclosing said stator, exclusive of allowance for said stator mounting means.

10. The device of claim 7, wherein said second pole shoe has a pair of cup portions extending radially from the periphery of said disc magnet means to define a chamber sized to accept said toroid.

11. The device of claim 10, wherein said cup portions include closure means for substantially enclosing said stator, exclusive of allowance for said stator mounting means.

12. The device of claim 1 wherein said disc magnet means includes a single disc magnet having faces with circumferentially alternating polarities.

* * * * *